US009623380B2

United States Patent
Sandru et al.

(10) Patent No.: US 9,623,380 B2
(45) Date of Patent: Apr. 18, 2017

(54) GAS SEPARATION MEMBRANE

(71) Applicant: NORWEGIAN UNIVERSITY OF SCIENCE AND TECHNOLOGY, Trondheim (NO)

(72) Inventors: Marius Sandru, Trondheim (NO); Taek-Joong Kim, Trondheim (NO); May-Britt Hägg, Trondheim (NO)

(73) Assignee: NORWEGIAN UNIVERSITY OF SCIENCE AND TECHNOLOGY, Trondheim (NO)

( * ) Notice: Subject to any disclaimer, the term of this patent is extended or adjusted under 35 U.S.C. 154(b) by 183 days.

(21) Appl. No.: 14/298,025

(22) Filed: Jun. 6, 2014

(65) Prior Publication Data

US 2014/0283685 A1 Sep. 25, 2014

Related U.S. Application Data

(63) Continuation of application No. 13/147,550, filed as application No. PCT/GB2010/000174 on Feb. 2, 2010, now Pat. No. 8,764,881.

(Continued)

(30) Foreign Application Priority Data

Feb. 2, 2009 (GB) .................................. 09016699.9

(51) Int. Cl.
*B01D 53/22* (2006.01)
*B01D 71/60* (2006.01)

(Continued)

(52) U.S. Cl.
CPC ........... *B01D 71/60* (2013.01); *B01D 53/228* (2013.01); *B01D 67/0083* (2013.01);
(Continued)

(58) Field of Classification Search
CPC ...... B01D 53/22; B01D 71/60; B01D 53/228; B01D 67/0083; B01D 67/0093;
(Continued)

(56) References Cited

U.S. PATENT DOCUMENTS 4,670,125 A    6/1987   Mueller et al.
4,690,766 A    9/1987   Linder et al.
(Continued)

FOREIGN PATENT DOCUMENTS

| EP | 1900419 A2 | 3/2008 | |
|---|---|---|---|
| WO | WO 0121671 A1 * | 3/2001 | ............. A61K 8/817 |
| WO | WO 2005/089907 A1 | 9/2005 | |

OTHER PUBLICATIONS

Chen "pH-Dependence of the Properties of Hydrophobically Modified Polyvinylamine" Langmuir 2005, 21, 11673-11677.*

(Continued)

*Primary Examiner* — Anthony Shumate
(74) *Attorney, Agent, or Firm* — Knobbe, Martens, Olson & Bear, LLP

(57) ABSTRACT

A membrane suitable for separating a gas from a gas mixture comprising a non cross-linked PVAm having a molecular weight of at least Mw 100,000 carried on a support wherein after casting onto the support, said PVAm has been heated to a temperature in the range 50 to 150° C., e.g. 80 to 120° C.

14 Claims, 5 Drawing Sheets

Related U.S. Application Data

(60) Provisional application No. 61/150,810, filed on Feb. 9, 2009.

(51) Int. Cl.

| | | |
|---|---|---|
| *B01D 67/00* | (2006.01) | |
| *B01D 69/02* | (2006.01) | |
| *B01D 71/44* | (2006.01) | |
| *C10L 3/10* | (2006.01) | |
| *F23J 15/02* | (2006.01) | |
| *B29D 7/01* | (2006.01) | |

(52) U.S. Cl.
CPC ......... *B01D 67/0093* (2013.01); *B01D 69/02* (2013.01); *B01D 71/44* (2013.01); *B29D 7/01* (2013.01); *C10L 3/10* (2013.01); *C10L 3/102* (2013.01); *F23J 15/02* (2013.01); *B01D 2053/221* (2013.01); *B01D 2257/504* (2013.01); *B01D 2258/06* (2013.01); *B01D 2323/30* (2013.01); *B01D 2325/34* (2013.01); *F23J 2215/50* (2013.01); *Y02C 10/10* (2013.01); *Y02E 20/326* (2013.01)

(58) Field of Classification Search
CPC ........ B01D 69/02; B01D 71/44; B01D 71/42; B01D 2053/221; B01D 2257/504; B01D 2258/06; B01D 2323/30; B01D 2325/34; B29D 7/01; C10L 3/10; C10L 3/102; F23J 15/02; F23J 2215/50; Y02C 10/10; Y02E 20/326

See application file for complete search history.

(56) References Cited

U.S. PATENT DOCUMENTS

| | | | | |
|---|---|---|---|---|
| 4,708,981 | A * | 11/1987 | Zupancic | B01D 69/141 524/417 |
| 5,086,111 | A * | 2/1992 | Pinschmidt, Jr. | C08F 8/28 525/60 |
| 5,131,927 | A * | 7/1992 | Bikson | B01D 67/0088 264/41 |
| 5,766,478 | A * | 6/1998 | Smith | B01D 61/16 210/638 |
| 5,849,841 | A * | 12/1998 | Muhlebach | C08F 8/30 522/144 |
| 7,094,464 | B2 * | 8/2006 | Mao | G01N 33/521 422/504 |
| 7,169,847 | B2 | 1/2007 | Solomon et al. | |
| 7,622,045 | B2 | 11/2009 | Vane et al. | |
| 7,896,948 | B2 | 3/2011 | Deng et al. | |
| 7,914,875 | B2 | 3/2011 | Jiang et al. | |
| 8,052,776 | B2 * | 11/2011 | Jiang | B01D 67/0009 210/500.37 |
| 8,764,881 | B2 * | 7/2014 | Sandru | B01D 53/228 95/43 |
| 9,126,137 | B1 * | 9/2015 | Vijayendran | B01D 53/02 |
| 9,162,178 | B2 * | 10/2015 | Hiraki | B01D 53/228 |
| 2007/0051680 | A1 | 3/2007 | Vane et al. | |
| 2008/0078290 | A1 | 4/2008 | Hägg et al. | |
| 2008/0156188 | A1 | 7/2008 | Hägg et al. | |
| 2008/0281044 | A1 | 11/2008 | Monahan et al. | |
| 2009/0110907 | A1 * | 4/2009 | Jiang | B01D 53/228 428/315.9 |
| 2009/0188857 | A1 | 7/2009 | Moore et al. | |
| 2010/0305217 | A1 | 12/2010 | Qiu et al. | |
| 2011/0052466 | A1 | 3/2011 | Liu | |
| 2013/0312604 | A1 * | 11/2013 | Amin-Sanayei | B01D 53/22 95/51 |
| 2015/0165390 | A1 * | 6/2015 | Hiranabe | B01D 71/56 95/55 |
| 2016/0008767 | A1 * | 1/2016 | Yoneyama | B01D 53/228 427/245 |
| 2016/0008768 | A1 * | 1/2016 | Yoneyama | B01D 69/12 427/245 |

OTHER PUBLICATIONS

Tanaka "Hofmann Reaction of Polyacrylamide: Relationship between Reaction Condition and Degree of Polymeriza tion of Polyvinylamine" Journal of Polymer Science: Polymer Chemistry Edition, vol. 17,1239-1245 (1979) John Wiley & Sons, Inc.*

El-Azzami, L.A. and Grulke, E.A. 2008 "Carbon dioxide separation from hydrogen and nitrogen by fixed facilitated transport in swollen chitosan membranes" *Journal of Membrane Science* 323: 225-234.

Kouketsu, T. et al. 2007 "PAMAM dendrimer composite membrane for $CO_2$ separation: Formation of a chitosan gutter layer" *Journal of Membrane Science* 287: 51-59.

Sandru, M. et al. "Efficient CO2 capture using fixed-site-carrier PVAm membranes" NAMS 2007 Meeting Abstract; May 12-16, 2007, Orlando, Florida, 1 pg.

Sandru, M. et al. "Fixed-site-carrier membrane for CO2 capture—membrane material and separation process optimization" ICOM 2008 Meeting Abstract, Jul. 12-18, 2008, Honolulu, Hawaii, 1 pg.

Yegani, R. et al. 2007 "Selective separation of $CO_2$ by using novel facilitated transport membrane at elevated temperatures and pressures" *Journal of Membrane Science* 291: 157-164.

Zou, J. and Ho, W.S.W. 2006 "$CO_2$-selective polymeric membranes containing amines in crosslinked poly(vinyl alcohol)" *Journal of Membrane Science* 286: 310-321.

* cited by examiner

GAS SEPARATION MEMBRANE

RELATED APPLICATIONS

This application is a continuation of U.S. application Ser. No. 13/147,550, which is the U.S. National Phase of International Application PCT/GB2010/000174, filed Feb. 2, 2010 designating the U.S., and published in English as WO 2010/086630 A1 on Aug. 5, 2010, which claims priority to U.S. Provisional Application No. 61/150,810 filed Feb. 9, 2009 and United Kingdom Patent Application No. GB 09016699.9 filed Feb. 2, 2009.

FIELD OF THE INVENTION

This invention relates to a membrane for separating gases from gas mixtures, preferably carbon dioxide from gas mixtures containing the same and to a process for the production of the membrane and use of the membrane to separate gases. In particular, the invention provides a membrane formed from a supported polyvinylamine (PVAm).

BACKGROUND OF THE INVENTION

Scientists have been investigating ways of separating components of industrial gas streams for many years. Recently, with the climate changes being observed due to carbon dioxide emissions, ways of separating carbon dioxide from gas streams to try to reduce the impacts of global warming have been widely researched.

In general, gases such as carbon dioxide are separated from gas mixtures with, for example, methane, nitrogen and/or carbon monoxide by reversible absorption methods employing various chemical and/or physical solvents, or by reversible adsorption in beds of adsorbents (e.g. activated carbon). As conventional processes for treating carbon dioxide are highly energy consuming and depend on the use of additional chemicals, the cost as well as the increased demand for environmental protection enforce more efficient separation processes to evolve. Membrane technology is such a new separation technique. Membrane modules also significantly reduce weight and space requirements of separation equipment.

One option for membrane separation is the use of a facilitated transport membrane, also known as a supported liquid membrane (SLM) with mobile facilitated transport carriers. These have been studied for over two decades and are known to have both high permeability of gases and high selectivity. However, for the SLM membranes serious degradation problems, such as evaporation of solution and deactivation of complexing agent (carrier), have restricted their further development and application. Facilitated transport membranes with fixed carrier, such as the PVAm blend membrane claimed herein are therefore favoured.

Other alternatives to facilitated blend membranes are however known. In J. Membrane Science 163 (1999) 221-227, the separation and recovery of carbon dioxide is achieved using polyethyleneimine/polyvinylalcohol membranes. Such membranes are however very dense and they therefore possess poor permeance. In this regard, permeance is a measure of the flow of a gas through the membrane. High permeance implies the ability to separate large volumes of gas with a reduced membrane area.

In U.S. Pat. No. 4,690,766, a modified polysulphone semi permeable membrane is disclosed for use in reverse osmosis and ultrafiltration.

In EP-A-1900419 a mixture of PVAm and polyvinyl alcohol (PVA) is used as a gas separating membrane. The PVAm exemplified is of very low molecular weight and is thus used on a support with relatively low molecular weigh cut off (MWCO).

In WO2005/089907, a support coated with a cross-linked PVAm is used as a carbon dioxide separating membrane. The cross-linking agent ammonium fluoride is used to ensure the cross-linking occurs. This membrane suffers however, from a decrease in flux, in particular at higher pressures, when high molecular weight cut off (MWCO) porous supports, e.g. those of MWCO 50,000 or higher, are used. This is believed to be caused by a compaction of the selective membrane layer which may result in a "filling-in" of the pores of the support structure.

There remains a need therefore to design further gas separating membranes which do not suffer from the problems highlighted above but which also possess excellent target gas selectivity and high permeance. The inventors have surprisingly found that certain membranes, e.g. a gas separation membranes comprising polyvinylamine exhibit excellent separation properties, excellent mechanical properties and are very stable. Moreover, certain membranes do not suffer from pore blockages (filling in) which may occur with other supported membranes.

The inventors have made the following remarkable observations in relation to gas separation membranes:

1. That as an alternative to cross-linking using an external cross-linking agent, thermal treatment of the formed membrane can be beneficial to the permeance and selectivity of the membrane 2. That the use of a higher molecular weight PVAm polymer can improve permeance and selectivity of a membrane relative to lower molecular weight materials;

3. Using higher molecular weight PVAm polymers enables the use of higher MWCO supports which in turn can enhance the permeance and selectivity of the membrane;

4. That cross-linking the PVAm using an external cross-linking agent may reduce the permeance and selectivity of the membrane, especially for high molecular weight membranes which are usable without cross-linking;

5. That for some high molecular weight PVAm containing membranes neither cross-linking nor thermal treatment is needed at all;

6. That careful selection of the solvent used to cast the membrane can enhance permeance and selectivity of the membrane;

7. That control of the pH during casting of the membrane is critical to maximising permeance and selectivity of the membrane;

8. That pre-treatment of the PVAm polymer used to manufacture the membrane can improve the permeance and selectivity of the membrane;

9. That the use of a high carbon dioxide permeance polymer layer (such as polydimethylsiloxane, polyvinyl alcohol or chitosan layer) between the membrane and support gives the membrane much higher mechanical strength without damaging the selectivity and permeance of the membrane.

The inventive membranes of the invention may comprise at least one, preferably a combination of the inventive features mentioned above. The invention encompasses any (viable) combination of these features.

SUMMARY OF INVENTION

Thus, viewed from one aspect the invention provides a membrane suitable for separating a gas from a gas mixture comprising a non cross-linked PVAm having a weight average molecular weight (Mw) of at least 50,000, preferably at least 100,000, carried on a support wherein after casting onto the support, said PVAm has been heated to a temperature in the range 50 to 150° C., e.g. 80 to 120° C.

Viewed from another aspect the invention provides a membrane suitable for separating a gas from a gas mixture comprising a non cross-linked PVAm having a molecular weight of at least Mw 50,000, preferably at least 100,000, carried on a support having a MWCO of at least 20,000, preferably at least 50,000.

Viewed from another aspect the invention provides a membrane suitable for separating a gas from a gas mixture comprising a non cross-linked PVAm having a molecular weight of at least Mw 50,000, preferably at least 100,000 carried on a support.

Viewed from another aspect the invention provides a membrane suitable for separating a gas from a gas mixture comprising a PVAm having a molecular weight of at least Mw 50,000, preferably at least 100,000 carried on a support wherein the membrane is non-strengthened.

Viewed from another one aspect the invention provides a membrane suitable for separating a gas from a gas mixture comprising a PVAm carried on a support comprising polytetrafluoroethylene (PTFE), polypropylene (PP), sulphonated polysulfone (PSf), polyvinylidene fluoride (PVDF), and related block copolymers, polyimide (PI), polyether imide (PEI), aliphatic polyamides, polyetheretherketone (PEEK), or polyphenylene oxide (PPO).

Viewed from another aspect the invention provides a membrane suitable for separating a gas from a gas mixture comprising a PVAm carried on a support wherein a carbon dioxide permeable layer separates the PVAm from the support, e.g. a layer of polydimethylsiloxane (PDMS).

Viewed from another aspect the invention provides a process for the formation of a membrane suitable for separating a gas from a gas mixture comprising:
  (I) obtaining a PVAm;
  (II) hydrolysing said PVAm under conditions of acid or base to form a pretreated PVAm;
  (III) forming a solution of said pretreated PVAm;
  (IV) casting said solution, e.g. on a porous support, to form a composite membrane; and optionally
  (V) thermal treating or cross-linking said membrane.

Viewed from another aspect the invention provides a process for the preparation of a membrane suitable for separating a gas from a gas mixture comprising:
  (i) forming a solution comprising polyvinylamine in a solvent
  (ii) casting said solution, e.g. on a porous support, to form a composite membrane; and optionally
  (iii) thermal treating said membrane
  wherein said solvent comprises methanol, ethylene glycol, formamide, mixtures thereof or mixtures of one or more of said solvents with water.

Viewed from another aspect the invention provides a process for the preparation of a membrane suitable for separating a gas from a gas mixture comprising:
  (A) forming a solution comprising polyvinylamine in a solvent;
  (B) casting said solution, e.g. on a porous support, to form a composite membrane; and optionally
  (C) thermal treating or cross-linking said membrane.
  wherein the pH of the casting solution is at least 6.

Viewed from another aspect, the invention provides use of a membrane as hereinbefore defined or produced by a process as hereinbefore defined in the separation of a gas from a gas mixture, e.g. in separating carbon dioxide from a mixture containing the same, e.g. in biogas upgrading.

DEFINITIONS

The combination of the membrane of the invention carried on the support is called a composite membrane herein.

Unless otherwise stated, a high/higher molecular weight PVAm polymer is one in which the MW is at least 100,000.

Unless otherwise stated, a high/higher molecular weight cut-off support is one in which the MWCO is at least 50,000.

The word "non cross-linked membrane" is used herein to denote that no external cross-linking agent has been used to cross-link the membrane.

Thermal treatment of the composite membrane means exposing the composite membrane to heat of at least 50° C.

By microporous support is meant a support having pores sizes of 0.10 to 10 µm.

By non-strengthened is meant that the PVAm membrane is neither cross-linked nor thermally treated.

DETAILED DESCRIPTION OF INVENTION

Support

Gas separating membranes can typically take two forms, supported or unsupported. The present membranes are carried on a support. As noted below, the support can be in the form of a flat sheet or a hollow fibre support. Both these support types are covered in this invention.

Suitable supports are known in the art and most are ones which are porous to the gas being transported. Suitable supports include polyethersulfone (PES), polytetrafluoroethylene (PTFE), polypropylene, sulphonated polysulfone, polyvinylidene fluoride, polyacrylonitrile (PAN) and related block copolymers, cellulosics such as cellulose acetate (CA), polyimide, polyether imide (PEI), aliphatic polyamides, polyetheretherketone (PEEK), polyphenylene oxide (PPO) and polysulfone (PSf). Such supports are available commercially from suppliers such as Osmonics. In a preferred embodiment the support is PSf, especially where the support is in the form of a flat membrane. Where the support is a hollow fibre both PSf and especially PPO are preferred.

Most of these supports are typically ultrafiltration membranes where the size of the pores in the membrane is of the order of 20 to 1000 Angstroms although it is more common to express pore sizes in terms of molecular weight cut off values.

In some embodiments of the invention, it is also within the scope of the invention to employ microporous support structures. Such supports have much bigger pores sizes, e.g. 0.10 to 10 µm making gas transport there through very rapid. It is not normal to express pore sizes of these supports in MWCO terms but in this invention, microporous supports are considered to have MWCO values of greater than 100,000.

Microporous supports can be formed from any suitable material including those mentioned above in connection with ultrafiltration membranes and inorganic materials such as ceramics (alumina, zirconium oxide), glass membranes such as silica and so on. These can be prepared by sintering, sol gel or leaching techniques known in the art.

Conventionally, it has been assumed that the use of these microporous supports in gas separation membranes using PVAm was not possible as the pores of the support are so large that the PVAm will simply collapse into the pores. As noted in more detail below, the inventors have solved this particular problem by utilising high molecular weight PVAm polymers which have been found not only to possess excellent permeance and selectivity but also excellent mechanical strength. The mechanical strength of these membranes allows them to be used without the problem of filling in even when the pores in the support material are micron sized.

The molecular weight cut off (MWCO) of the support is preferably kept as high as possible. MWCO is essentially a measure of the pore size in a support with larger MWCO values representing higher pore sizes. The MWCO in this invention is preferably more than 20,000, e.g. at least 35,000, preferably more than 50,000, more preferably at least 60,000, especially at least 75,000. In a highly preferred embodiment the MWCO is at least 100,000. In fact, the invention enables the use of supports having MWCO of up to 300,000, e.g. 60,000 to 300,000. In one embodiment, the MWCO may be less than the molecular weight Mw of polymer cast on top. This is not however essential.

The problem here is that as MWCO increases, the size of the pores in the support also increases. This leads to the problem of filling in, where the membrane on the support collapses into the pores. There has therefore been a limit on the MWCO of the support as this cannot be so high as to cause the filling in problem. In the prior art, the MWCO of the exemplified support is typically no more than 50,000.

It has been surprisingly found that when a membrane of the invention was prepared using a PVAm of high molecular weight, the problem of "filling in" is minimised even if using a high molecular weight support. This then allows the use of a high MWCO support and can therefore lead to an improvement in permeance and selectivity.

Without wishing to be limited by theory, when using porous supports with larger pores, whether ultrafiltration or microfiltration supports, the increased pore size not only decreases the mass transfer resistance towards a gas to be separated but also changes the support separation mechanism itself. An ultrafiltration membrane with low pore size (low MWCO) may present selectivity towards nitrogen, for example, via Knudsen diffusion and not towards carbon dioxide.

As noted in more detail below, using a high Mw PVAm allows the use of porous support with larger pores and consequently low mass transfer resistance towards the gas molecules separated by the PVAm membrane without affecting mechanical stability.

In a preferred embodiment the support can have a porous lower layer with a thin dense top layer. By dense is meant that there are no pores in the dense top layer.

The dense top layer is preferably no more than 60 nm in thickness, e.g. around 40 nm or less in thickness. It is however within the scope of the invention for the dense layer to have a greater thickness e.g. 100 to 1000 nm, such as 200 to 700 nm, e.g. 600 nm Supports with dense top layers are preferably hollow fibre supports and ideally can be formed from PPO. The dense top layer is formed during the spinning process.

Polyvinylamine (PVAm)

The weight average molecular weight (Mw) of the PVAm polymer used in this invention can range from 10,000 to 3,000,000, e.g. 20,000 to 750,000 such as 30,000 to 500,000.

The weight average molecular weight (Mw) of the PVAm is at least 50,000. Preferably, the Mw of the PVAm polymer is at least 100,000, more preferably at least 150,000, especially at least 200,000. In some embodiments the Mw can be at least 250,000, even at least 300,000.

It has been found that using higher Mw gives the membrane strength. This allows the use of a support with a much higher MWCO. It is a specific feature of the invention therefore to use a PVAm polymer having a Mw of at least 100,000 with a support having a MWCO of at least 60,000.

It has also been surprisingly observed that even when using a higher molecular weight PVAm, this does not result in a reduction in permeance or selectivity. The use of a higher Mw PVAm polymer means that the actual membranes used will tend to be denser than membranes formed from lower Mw polymers. Surprisingly, the inventors have found that even at higher densities the permeance values of the membranes remain very high and the gas selectivity is good.

A further benefit of the use of a higher Mw PVAm membrane concerns water uptake. The higher Mw PVAm membrane has more densely packed molecular chains meaning more densely packed amino groups. This leads to greater water uptake in comparison to lower Mw PVAm membranes which promotes reactivity of the amino groups to, inter alia, carbon dioxide.

The skilled man might also expect that increased water uptake would lead to membrane swelling and hence lower permeance values as thicker membranes are obviously harder for gases to cross. However, any swelling which does occur is limited and counter balanced by the increase in carbon dioxide transfer which the higher uptake of water facilitates.

The combination therefore of higher molecular weight PVAm polymer membranes with high MWCO supports provides composite membranes with excellent properties.

A further benefit of the use of higher Mw membranes is their ability to withstand greater pressures. The membranes of the prior art are conventional used at low gas pressures. Flue gases from industrial plants can however be at relatively high pressures, e.g. up to 15 bars and ideally any membrane would be able to carry out gas separation on such higher pressure gases. In particular, it is preferred that the permeance and selectivities obtained at higher gas pressures are not reduced (or not significantly reduced) relative to operation at lower pressures. It is a further feature of this invention that the membranes claimed are able to handle gases which are under pressure, e.g. at a pressure of up to 20 bars, e.g. up to 15 bars, such as 2 to 15 bars or 2 to 10 bars.

As noted above, in WO2005/089907, the inventors teach the cross-linking of the PVAm using ammonium fluoride. The inventors have surprisingly found that the cross-linking step for high Mw PVAm (340000 Mw) actually leads to a reduction in permeance and selectivity as it causes densification of the top layer of the membrane making it harder for the carbon dioxide to come into contact with the amine groups in the polymer. For a lower molecular weight PVAm polymer however, cross-linking is essential to provide a membrane with sufficient strength that it will not "fill in" the pores in the support.

The inventors have found that when using a higher Mw PVAm membrane, the requirement to cross-link using a cross-linking agent is no longer present as the higher Mw provides the membrane with sufficient strength that the filling in problem is overcome. Also, despite the use of a higher Mw PVAm causing an overall densification of membrane relative to a lower Mw PVAm membrane, the inventors have surprisingly not observed any reduction of permeance or selectivity caused by the use of a higher Mw PVAm. In fact the opposite observation is made and the membranes actually perform better than cross-linked counterparts. It is especially preferred therefore if the membrane of the invention is not cross-linked using an external cross-linking agent.

The inventors have found however that thermal treatment of the composite membrane can provide advantageous properties, especially where the membrane will operate at elevated gas pressures, e.g. above 10 bars.

By thermal treatment is meant exposing the composite membrane (i.e. membrane on the support) to heat to induce strength therein. Suitable thermal treatment conditions encompass heating to 50 to 150° C., e.g. 80 to 120° C., especially 90 to 110° C. This thermal treatment step is not regarded as being a cross-linking step as no external cross-linking agent is employed however it does impart additional strength to the membrane, perhaps by encouraging intermolecular interaction between polymer chains and between the PVAm layer and the porous support.

Thermal treatment has been found to be better than ammonium fluoride as the permeance values and selectivities of otherwise identical composite membranes are better than ammonium fluoride cross-linked analogues.

It will be clear that thermal treatment of the PVAm membrane takes place when this is supported. Without wishing to be limited by theory, it is believed that the thermal treatment step also modifies the support thus allowing improved permeance values. It may be that the interaction between the support and the dense layer of PVAm is improved.

In some embodiments of the invention, particularly when the membrane is for operation at lower gas pressures (e.g. less than 10 bars), the PVAm membrane can be neither cross-linked nor thermally treated. This will be termed "non strengthened" herein. It has previously been accepted that some form of membrane strengthening is essential to provide a membrane of sufficient strength however that is not the case where a higher molecular weight PVAm polymer is employed.

As noted above, PVAm polymers are available commercially and can be supplied in their hydrochloride salt form although the skilled chemist will appreciate that in reality PVAm is a copolymer with an equilibrium existing between the ammonium salt form and free amino form of the polymer. These are named protonic form and basic form and the equilibrium is obviously pH dependent.

PVAm is normally supplied in 90%+ hydrolysed form (i.e. at least 90+% of the polyvinyl amide groups are hydrolysed to amino groups)—more than 90% is in PVAm and 10% is in polyvinylformamide form. These PVAm polymers still therefore contain significant levels of polyvinylformamide polymer.

Until now, these commercial polymers have been used as supplied by the supplier however the inventors have found that permeance and selectivity results can be improved if the PVAm polymer is hydrolysed prior to casting. This additional hydrolysis step can be carried out under acid or base conditions using strong or weak acids or bases This reaction will typically take place in aqueous solution. Acidic hydrolysis is preferred.

The necessary reaction may involve multiple steps. It is preferred if the PVAm polymer is firstly re-precipitated from a suitable solvent, e.g. acetone or acetone and ethanol mixture. It can then optionally be washed, filtered and dried normally until a constant weight is achieved. The precipitate is then re-dissolved in distilled water. This procedure can be repeated several times.

The resulting polymer solution can be hydrolysed in acid or base but preferably by acidic hydrolyse, e.g. in presence of HCl. The HCl used is typically quite strong, e.g. of the order of 2 to 10 M, e.g. 3 to 7M such as 5M solution. The PVAm can then be re-precipitated in the form of PVAm.HCl (protonic form). The material which forms is of higher purity and performs better in the membranes of the invention than materials supplied commercially. It is preferred therefore to minimise the polyvinylamide content in the claimed polymers, e.g. to less than 5 wt %, especially less than 1 wt %

In some embodiments, it is preferred that the PVAm is in the form of a salt, e.g. a chloride salt as the presence of ions is believed to create polar sites within the membrane. This enhances gas separation between non polar and polar gases. As noted further below however, pH manipulation is an important part of the casting process and affects the pH of the formed membrane.

Other Membrane Components

It is preferred if the membranes of the invention consist essentially of PVAm, i.e. PVAm forms the only material used in the membrane other than minor levels of any necessary additives such as stabilisers, anti-oxidants or residuals solvents etc.

Support Formation

The support can be in the form of a flat sheet or hollow fibre. Techniques for making these supports are known in the art.

The hollow fibre process will normally involve dissolving the support material in a suitable solvent to form a solution and then spinning the solution to form hollow fibres. In the spinning process, the support solution is fed by the force of a pump to a spinneret and subsequently extruded. A bore liquid is passed through the centre of the spinneret to ensure that the fibres which form are hollow. The fibres pass out of the base of the spinneret and eventually into a coagulation bath. There is however, an air gap between the base of the spinneret and the coagulation bath. The presence of an air gap allows solvent evaporation and also allows the fibres to stretch and straighten under their own weight. This hollow fibre spinning technology is well known to the skilled person.

It will be appreciated that where there is a hollow fibre the membrane can be formed on the outside or inside of the fibre (although preferably not both). External coating can be performed simply using spraying or dip coating in a PVAm solution. Internal coating of hollow fibres involves circulating a PVAm solution inside the hollow fibre lumen, followed by drying as in the case of outside dip coating. The procedure is repeated until a thin defect free layer of PVAm is formed. Coating internally is preferred.

In a preferred embodiment the support can have a porous lower layer with a thin dense top layer. Supports with dense top layers are preferably hollow fibre supports and ideally can be formed from PPO or PSf. The dense top layer is formed during the spinning process.

Composite Membrane Formation

The first stage in the formation of the composite membrane of the invention involves casting a solution of the PVAm polymer onto the support. The support can typically be in the form of a flat sheet or bundle of hollow fibres. Casting of the solution is carried out using known techniques. Various options are available for coating supports with thin films and these include dip coating, vapour deposition, spin coating, and spray coating. These techniques will be deemed to be "casting" according to the invention.

Where the support is a hollow fibre the term casting will typically mean dipping or spray coating of a hollow fibre support. Where the membrane is located within the hollow fibre the term casting covers the process described above.

The solution of PVAm is typically aqueous but it has been found that other solvents can actually offer the formation of composite membranes with even better permeance and selectivity. This finding is new and forms a further aspect of the invention.

Other solvents which can be employed include methanol, ethylene glycol and formamide ($HCONH_2$) or mixtures of these solvents with each other or with water. It is important that the solvent or solvent mixture employed dissolves the polymers in question. Preferred solvents include a methanol/water mixture, ethylene glycol/water and formamide/water mixture, e.g. containing at least 60 wt % formamide. The combination of methanol and water is particularly advantageous when forming flat sheet membranes. It has been observed, for instance that the methanol water combination is slightly less hydrophilic than water alone and therefore interacts more favourably with the support allowing easier and better film formation.

The use of ethylene glycol and formamide slows down the solvent evaporation time which has also been found to enhance the quality of the formed film. Ethylene glycol is of particular interest where the support is a hollow fibre.

The concentration of the PVAm polymer in the solution may range from 0.01 to 20 wt %, preferably 0.05 to 10 wt %. Ideal membranes have been formed using concentrations of around 0.1 to 2 wt %, e.g. 1 wt %.

To ensure dissolution and thorough mixing, stirring and sonication can be used at this point. The solution can also be filtered.

The inventors have realised that depending on the solvent which is chosen, the pH of the solution from which the membrane is cast may differ. Formamide is a basic solvent whereas methanol and water are mildly acidic. The inventors have found that pH control of this solution is crucial to the manufacture of a membrane with high permeance and/or selectivity and this is a new finding and forms a further aspect of the invention. The PVAm polymer possesses numerous amino groups that can exist either in uncharged amino form or as the ammonium salt depending on the pH.

The actual pH of solution from which the membrane is cast can vary over quite wide limits depending on the solvent. As noted above, the chloride atoms present in a hydrochloride salt might enhance separation of polar and non polar gases and hence in some embodiments of the invention the pH may be in the range 2 to 6.5, e.g. 3 to 5. It is preferred however if the pH of the solution is slightly more basic as this has been found to increase permeance in the formed membrane. For example pH values of 6 to 12 are preferred, e.g. 7 to 11.

It is an embodiment of the invention therefore for the casting solution of PVAm that the pH of the solution is carefully chosen depending on the solvent. This can be achieved by using some of the solvents mentioned above or can be achieved in by adding acid or base or by suitable buffering solutions. Such an acid or base will be one which does not otherwise degrade the membrane/PVAm and will be easily chosen by the skilled man. The use of buffer solutions is of particular importance here.

The control of pH is also important in membrane formation control, in particular in thickness control. Depending on the pH used, the viscosity of the casting solution varies. At pH 2, the PVAm is present mostly in protonic form.

Scheme 1: Polyvinylamine equilibrium in aqueous solution

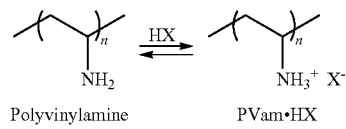

Polyvinylamine      PVam·HX

The solution viscosity of fully protonated PVAm.HCl is high due to the high cationic charge density on the polymer backbone. The different solvents such as water, ethylene glycol, formamide, methanol, and any mixture of these provide different pH values and different volatilities and the quality of very thin films can be affected by drying conditions, especially for hollow fiber membrane coatings. The viscosity of casting solution and hence its pH is thus an important factor in membrane preparation on porous supports as factors such as solution concentration, solvent, pH and charge density of polymer affect membrane formation.

The thickness of the formed membrane will vary depending on the concentration of the solute with higher concentration solutions giving thicker membranes. Thickness can be adjusted however using a casting knife.

The thickness of the actual membrane of the invention may be in the range 100 nm to 100 μm, preferably 250 nm to 10 μm, especially 300 nm to 5 μm. Thin membranes tend to have higher permeance values but are also less strong.

The thickness of the support on which the membrane can be carried can vary although this may be of the order of 50 to 500 μm, e.g. around 200 μm. It will be appreciated however that this invention covers both the use of a flat membrane as well as the use of a hollow fibre support. When the support is a hollow fibre support the thickness of the support is regarded as the wall thickness of hollow fibre.

After formation of the membrane on the support, the solvent is removed, e.g. by evaporation. This can be achieved using gentle heat if necessary, e.g. less than 50° C.

To avoid any possible loss of membrane forming material into the support it is normal if there is a reasonable difference between the average molecular weight of the PVAm and the molecular weight cut-off of the support structure. Such a difference may be larger than about 10,000, such as larger than about 15,000, for example larger than about 20,000, especially more than 50,000.

The formed membrane can then be cross-linked if desired. Cross-linking could be effected chemically using cross-linking agents such as glutaraldehyde or ammonium fluoride. As noted above however it is preferred if the membrane is not cross-linked.

It is also at this stage of the manufacturing process that thermal treatment of the membrane can be effected.

The resulting membrane acts as a fixed site carrier (FSC) for gas, e.g. carbon dioxide, transport due to the high concentration of amino groups.

As noted below in the Examples, the membranes of the invention have excellent mechanical strength evidence by the fact that a very thin, non cross-linked membrane (~1 μm) can be formed on a porous support with high MWCO (~50,000) and can resist high pressure without a 'filling-in' problem (at least 15 bar).

A further solution to the problem of 'filling-in' is to use an additional porous support layer on the support to carry the membrane and prevent it from collapsing into the pores of the support. The inventors have found that various gas permeable layers can be used in this regard such as polydimethylsiloxane, chitosan and polyvinyl alcohol can fulfil this role. Moreover, by using an additional porous supporting layer, the inventors enable the combination of PVAm with all manner of microporous supports which would otherwise suffer from collapse into the relatively massive pores of a microporous membrane. T. Kouketsu, S. Duan, T. Kai, S. Kazama, K. Yamada, PAMAM dendrimer composite membrane for CO2 separation: Formation of a chitosan gutter layer, J. Membr. Sci., 287, (2007), 51-59, describes the formation of a chitosan gutter layer.

The gas permeable layer can be introduced onto the support by casting the polymer in question (e.g. PDMS) in liquid form onto the support. The thickness of the layer can be 100 nm to 100 µm, preferably 250 nm to 10 µm, especially 300 nm to 5 µm. Ideally the layer should be as thin as possible whilst still providing the necessary mechanical strength. Thereafter the membrane can be formed on the permeable layer as described above.

Tests have shown that membranes of the invention can be used for at least 800 hours without any significant loss of activity and this forms a further aspect of the invention.

The membranes of the invention operate most effectively when they are humid. Before use of the membranes therefore, they may be swelled in the presence of water, e.g. in the form of vapour. Ideally, the membranes of the invention should operate in a humid environment, e.g. at least 75% relative humidity.

The process for the preparation of the membranes of the invention therefore preferably further comprises a step of contacting the membrane with water, e.g. with water vapour and/or operating the membrane in a humid environment.

It is envisaged that the presence of water vapour in the membrane facilitates carbon dioxide transport across the membrane.

Gases which can be separated from gas mixtures using the membranes of the invention include carbon dioxide with various components such as nitrogen, methane, carbon monoxide, oxygen, volatile organic compounds or hydrogen. Separation of mixtures involving hydrogen is also envisaged. These gases can occur in any circumstance such as in industrial and domestic gas streams. In use, the gas mixture to be separated will typically flow across the membrane under pressure. The temperatures employed can vary but typically at temperatures are in the range of 10 to 90° C., preferably at 20 to 65° C. It is possible to work at even higher temperatures however and separation at temperatures of greater than 100° C. may offer improved results.

Preferably, the membrane is used to separate carbon dioxide from nitrogen or methane. In this latter regard, the membranes of the invention may therefore have applications in the field where these gases are present in mixtures such as flue gas, biogas upgrading or possibly sweetening of natural gas.

The pressure at which the gas mixture is applied to the membrane is important as it affects the flow across the membrane and potentially the selectivity thereof. Feed pressures may therefore be in the range of 1.0 to 100 bars, e.g. 1.0 to 20 bars, especially 2 to 15 bars. The membranes of the invention are especially useful for feed pressures of at least 3 bars, preferably at least 4 bars, especially at least 5 bars, more especially at least 10 bars. Feed pressure can be in the range of 1 bar (typical flue gas)—80 bar (typical natural gas). The membrane of the invention is most useful for application at pressures below 10 bar.

The membranes of the invention preferably exhibit selectivities of at least 20, more preferably at least 50, especially at least 100, most especially at least 150. Selectivity is measured as described in the examples.

Permeance values in m$^3$(STP)/m$^2$·h·bar are preferably at least 0.1, preferably at least 0.2, especially at least 0.3, most especially at least 0.4, e.g. 0.4 to 1.0

The invention will now be further described with reference to the following non-limiting examples and figures.

PERMEATION TESTING

Figure 1:
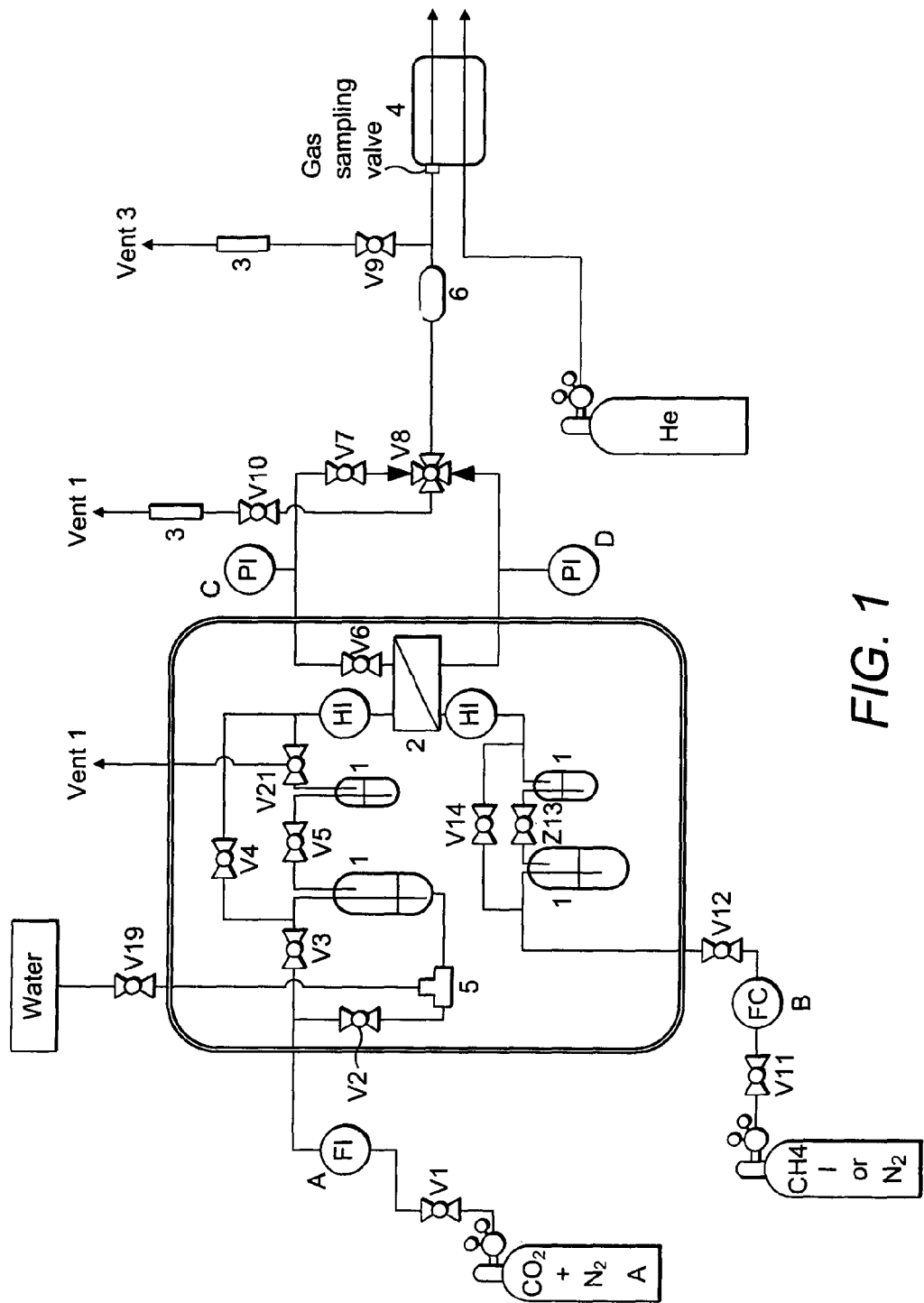
FIG. 1 is a diagram of the experimental set up used to measure permeance.

Permeance of the membranes was measured with an apparatus equipped with a humidifier, see FIG. 1. FIG. 1 shows an experimental setup for gas permeation measurements. The chosen gases may be mixed in any ratios in a gas flow line A, in which flow, pressures and temperature are controlled. The gas mixture is lead to humidifiers in tanks 1 where it bubbles through water, and then to a membrane separation cell 2. Either the retentate stream, or the permeate stream may be lead to a gas chromatograph (GC) 4 for analysis of the composition. The water excess is removed by a liquid separator 6 before going to the GC.

The various gas flows are controlled by valves and flow controllers. The abbreviations FI, FC, PI and PC in circles are flow indicator (FI), flow controller (FC), pressure indicator (PI) and pressure controller (PC), respectively. The use of this equipment will be familiar to the skilled person.

Premixed gas with a molar composition of 10% $CO_2$-90% $N_2$ was used as feed and methane was used as a sweep gas, both feed and sweep gases being humidified by passage through two water bubblers. The permeate side was maintained at atmospheric pressure and the total flow (permeate plus sweep) was measured with a soap bubble meter. The RH % was controlled by two bypass valves controlling the ratio of dry/wet gas ($V_4$ and $V_{14}$). The compositions of the permeate and feed were analysed continuously by a micro GC (gas chromatograph) Agilent 3000 equipped with two thermal conductivity detectors (TCDs) and two columns, Molecularsieve and Plot Q. A liquid separator was installed before GC sampling valve in order to prevent the moisture penetration inside GC. The permeance of $CO_2$ and $N_2$ was calculated using complete mixing model, from the total permeate flow rate measured with a soap bubble meter, feed and permeate pressure and the gas compositions of feed and permeate gas measured by GC.

$$Q_i = \frac{J_i}{A(x_{r,i}p_h - x_{p,i}p_1)}$$

where $Q_i$ represents the permeance (m³(STP)/(m² bar h)) of component i ($CO_2$ or $N_2$), Ji represent the flux m³(STP)/h, A the membrane area (m²), $x_{r,i}$ and $x_{p,i}$ molar concentration on feed and permeate side respectively (mol %) and $p_h$ and $p_l$ absolute pressure on feed and permeate side (bar).

The selectivity α of $CO_2$ over $N_2$ was calculated using the permeance ratio of the two gases when permeating together in a mixture (10% $CO_2$-90% $N_2$) without excluding the reciprocal coupling effect between gases.

All experiments were conducted at a constant temperature of 25° C. and the pressure difference between the feed and the permeate sides was 1-15 bar.

Results for the membranes of the invention with a 10% $CO_2/N_2$ mixture are presented in the figures.

Example 1

PVAm Purification (Pre-Treatment)

PVAm with a molecular weight of 340 000 was purchased from BASF and is a linear polymer (Scheme 1) having more than 90% of the amide groups of polyvinylformamide (PVAF) hydrolyzed to amino groups—more than 90% is in PVAm and 10% is in PVAF form. The polymer is obtained by polymerization of the vinylformamide (VFA) monomer to polyvinylformamide and consequently hydrolyzed under acid or basic conditions to form polyvinylamine.

Scheme 1

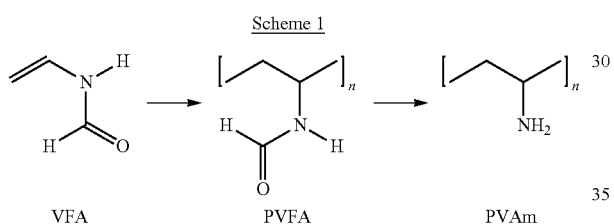

VFA     PVFA     PVAm

The PVAm polymer was provided in the form of aqueous solution with pH=8. Further purification of the polymer was carried out in order to remove possible traces of vinylformamide monomer or other impurities and to maximize the hydrolysis degree.

The solution was purified in successive steps:
(I) re-precipitation in acetone and/or acetone and ethanol blend:
(II) washing with acetone
(III) filtration
(IV) drying until constant weight and
(V) re-dissolution in distilled water.

This procedure was repeated several times and the resulting polymer solution was completely hydrolysed by acidic hydrolyse in presence of HCl 5M solution and was re-precipitated in the form of PVAm.HCl (protonic form).

Example 2

Comparative PVAm (Mw 80,000) was prepared by the Hofmann reaction of polyacrylamide based on Hiroo Tanaka and Ryoichi Senju, Preparation of polyvinylamine by the Hofmann degradation of polyacrylamide, Bulletin of the chemical society of Japan, 49, 10 (1976) 2821.

Example 3

Flat Sheet Membrane Preparation

Composite asymmetric membranes were prepared by casting a solution of PVAm onto asymmetric porous polysulfone supports. The polysulfone porous support was either MWCO 20000 or 50000 respectively. The supports were washed in advance with large amounts of distillate water. The desired thickness of the PVAm layer was controlled by pouring a known volume of solution into a confined circular surface with known area on the support. The calculated and resulted PVAm membrane thickness was 1.2 μm on dry basis for all membranes (unless otherwise mentioned). The thickness of the dry membranes was confirmed from Scanning Electron Microscopy (SEM) cross section pictures.

The membranes were dried at 45° C. for 90 minutes and then kept at room temperature for 24 hours. Membranes were used as such or treated as described in Example 4.

Example 4

Cross-Linking/Thermal Treatment

For the cross linking experiments, ammonium fluoride solution was used. The membranes were cross linked with a known volume of aqueous solutions of $NH_4F$ having concentrations of 1M to 3M. Subsequently the membranes with $NH_4F$ were heat treated at 90° C. for one hour and kept for 24 hours at room temperature before permeation tests.

Thermal treatment was carried out by annealing the obtained membranes at 90° C.-125° C. for one hour in absence of ammonium fluoride.

Example 5

Hollow Fibre Type Membrane Preparation

The membranes were prepared using hollow fibre membrane porous supports formed from polysulfone (PSf) or polyphenylene oxide (PPO). Two procedures for coating outside and respective inside hollow fibre were developed. For outside coating, the membranes were prepared by dip coating technique: the porous support was immersed in PVAm aqueous solution followed by drying at 45° C. The procedure was repeated until a defect free film of PVAm was formed on the surface of the porous support. The resulted hollow fibres were thermally treated (annealed) at 90-125° C.

For inside coating, aqueous PVAm was circulated for 30 minutes inside the hollow fibre lumen, followed by drying as in the case of outside dip coating.

In more detail, supports were mounted in a module and coating inside was performed in steps:

A vacuum pump was connected to the module, evacuating the outside of the hollow fibre from atmospheric pressure to 30 mbar (see T. Kouketsu et al, supra).

The coating solution was circulated for 30 minutes into the bore side of hollow fibres The excess solution was removed by nitrogen purge The coated hollow fibres were dried and the temperature and the drying time were dependent on the boiling point of the solvents used More than one layer of PVAm can be applied The following day, heat treatment of the membrane was performed as per outside coating.

Example 6

Membrane Testing: Water Uptake (Swelling Degree) Experiments were Measured on the Non Strengthened Flat Membranes Maximum water uptake capacity of PVAm by weight was investigated using fully humidified nitrogen. Water uptake by membranes represents a key parameter for facilitated transport where the reaction between $CO_2$ and amino groups takes place in presence of water. High water uptake capacity is directly related to density of polar groups (amino groups) per volume. The degree of polymeric chains entanglement will dictate the water "holding" capacity of polymer. Water has a positive effect by catalysing the reaction between amino groups and the $CO_2$, provides a transport medium for the $CO_2$ to the amino group reaction sites and increases polymeric chains mobility. Water uptake could have had the negative effect of loosening the PVAm structure to the point of disrupting completely the chain packing but that is surprisingly not observed. The effect of swelling on the mechanical stability of the PVAmHM membrane is counterbalanced by the dense chain packing.

Figure 9:
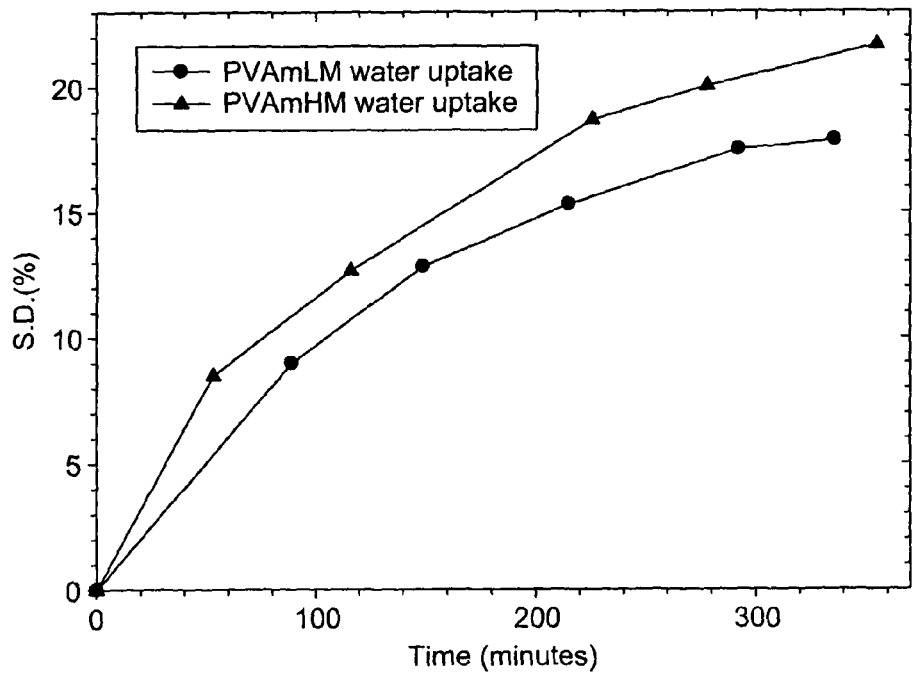
FIG. 9 shows the water uptake contrast between high and low Mw PVAm membranes.

The Mw influence on water uptake was investigated by comparing the water uptake of PVAmHM (340000 Mw) to that of PVAmLM (80000 Mw). As can be seen from FIG. 9 the water uptake (SD %) increases fast with time, approaching a plateau after 6 hours. The experiments were carried out until no change in the mass of swollen polymer was observed (22-24 h). PVAmHM presented a maximum water uptake at equilibrium of 31.4% and PVAmLM 24.7% by weight. From repeated measurements PVAmHM presents in average 23% higher water uptake than PVAmLM. This fact can be explained by the PVAmHM's higher Mw (longer polymer chains), providing a more entangled structure and higher density of polar sites per polymer volume. The higher water uptake of PVAmHM in comparison with PVAmLM can be interpreted in terms of better structural film integrity in absence of crosslinker under humid conditions.

Example 7

Effect of Molecular Weight on $NH_4F$ Cross-Linked Flat Membranes

The higher molecular weight PVAm ensures a denser packing of the amino groups and higher water uptake leading to higher selectivity and permeance compared to low molecular weight PVAm.

Four times higher Mw of PVAm (340 000) allows the use of a porous support with higher MWCO that increases permeance without affecting the mechanical strength of the composite membranes.

Using larger pore size not only decreases the mass transfer resistance towards $CO_2$ but it changes the support separation mechanism itself. An ultrafiltration membrane with low pore size (MWCO) may present selectivity towards the $N_2$ via Knudsen diffusion and not towards $CO_2$.

Example 8

Effect of Support

Figure 6:
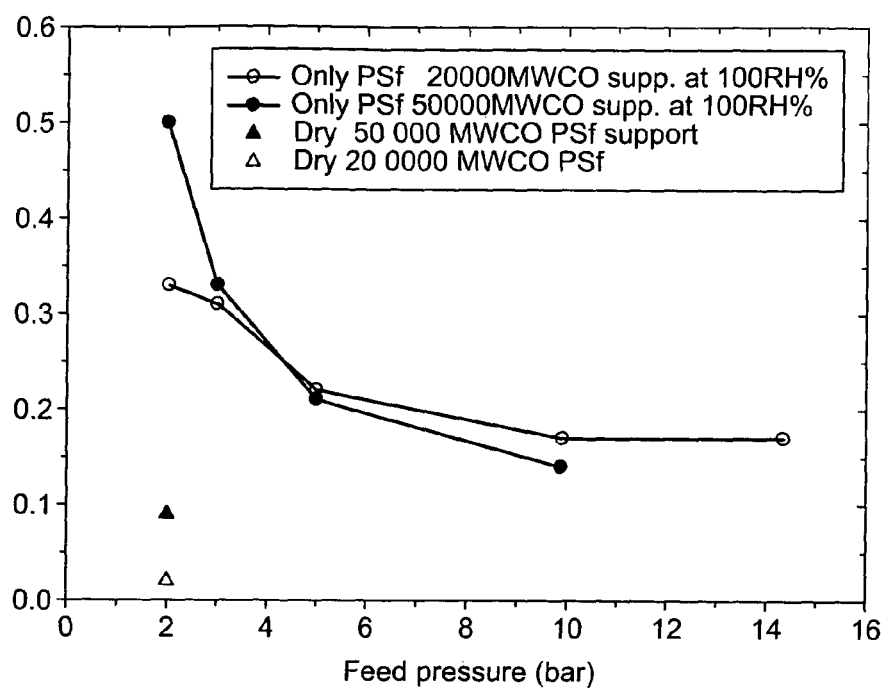
FIG. 6 shows permeance variation of the support.

We investigated the influence of the support as a separate membrane under normal operating conditions in order to clearly accesses its contribution to the overall membrane performance especially in the humid conditions. FIG. 6 show the separation performance of the porous supports tested with mix gas feed. As can be seen the dry PSf has a very low $CO_2$ permeance and selectivity. The porous supports act as membranes presenting selectivity when using humidified gases. It is clear from FIG. 6 that high MWCO support presents higher $CO_2$ permeance especially at lower pressure ranges.

Example 9

Crosslinking

Figure 2:
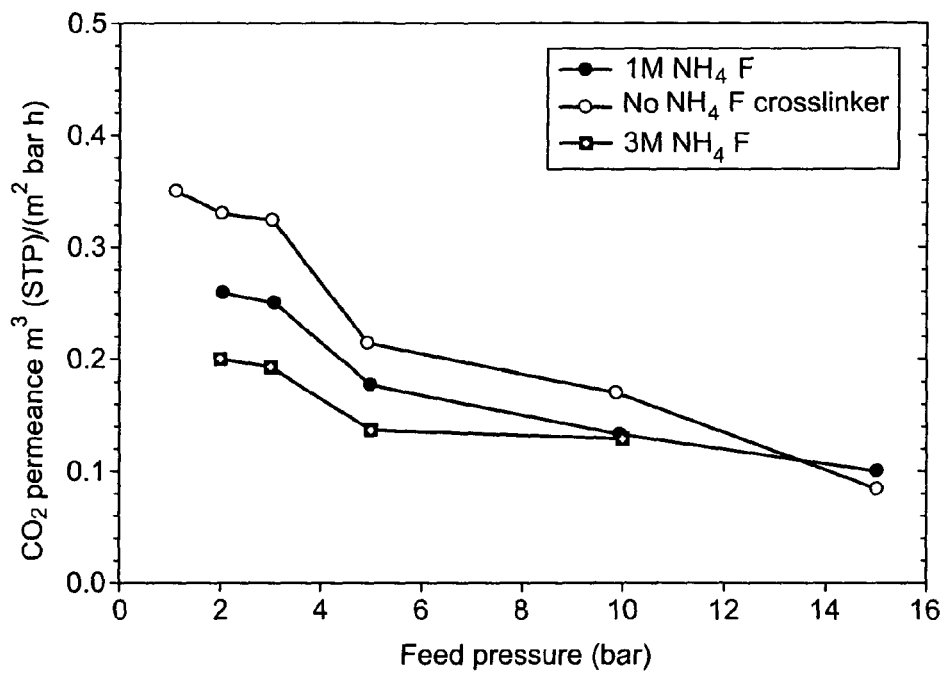
FIG. 2 shows permeance variation with feed pressure for cross-linked vs thermally treated membranes.
Figure 3:
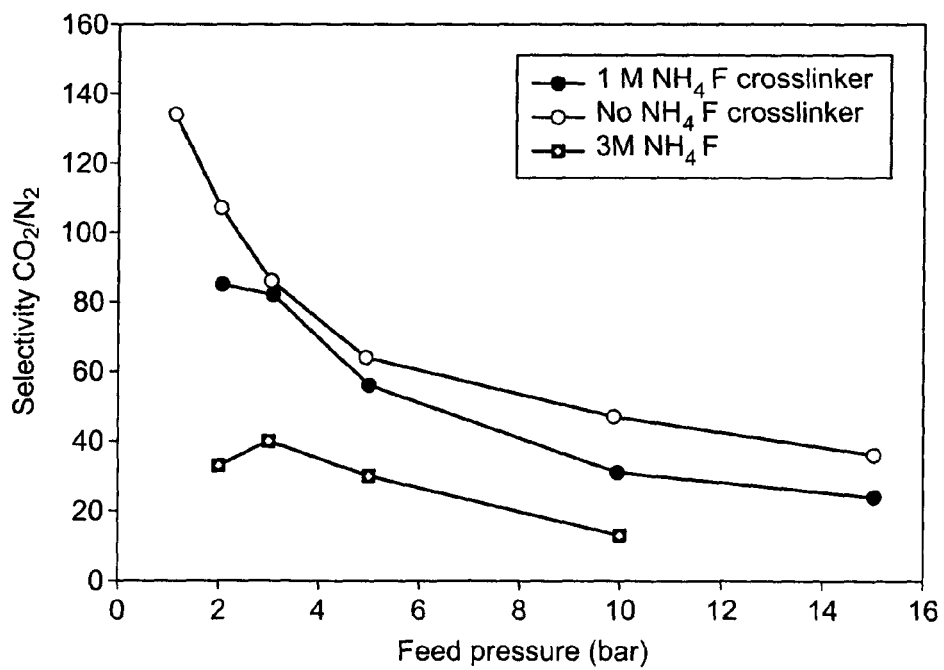
FIG. 3 shows selectivity variation with feed pressure for cross-linked vs thermally treated membranes.

FIGS. 2 and 3 show the effect of the $NH_4F$ solution concentration used for crosslinking at 90° C. High Mw provides a more entangled structure of the polymeric chains (equivalent of a crosslinking) providing better film mechanical properties in absence of a crosslinker.

Example 10

Effect of Thermal Treatment

Figure 7:
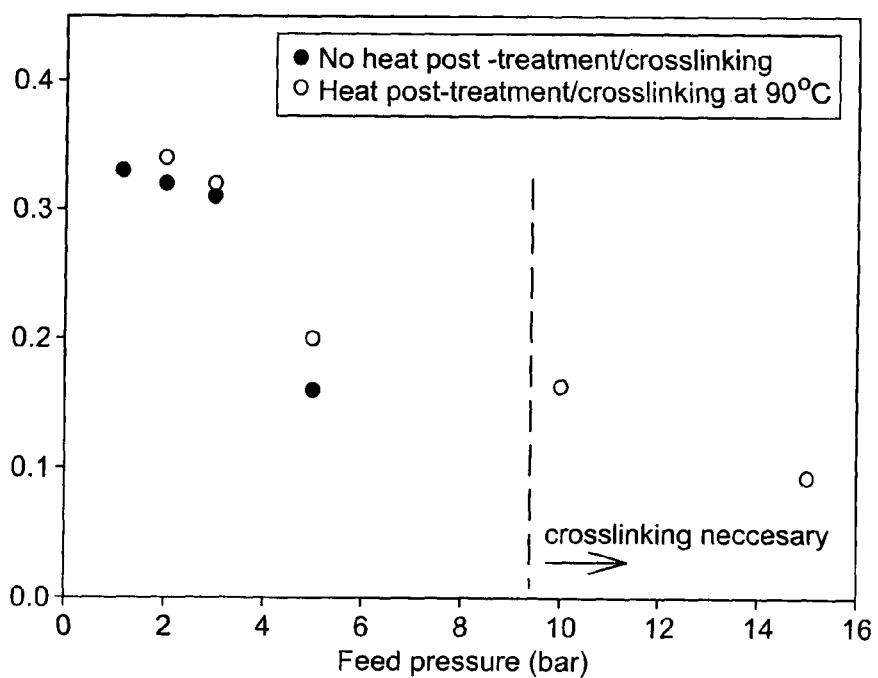
FIG. 7 shows permeance variation of the composite membranes of the invention using thermally treated membranes vs non strengthened membranes.
Figure 8:
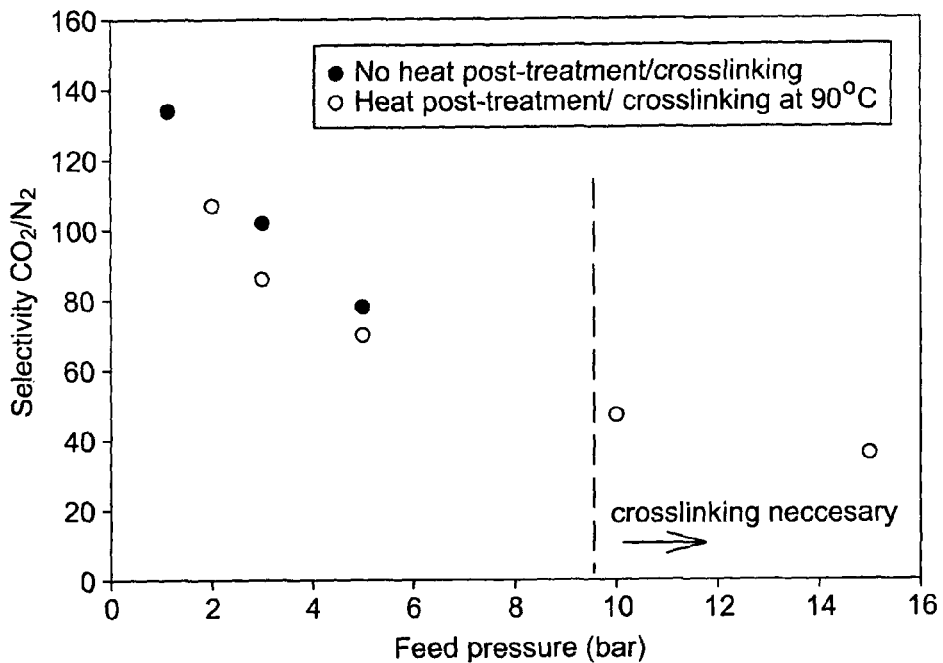
FIG. 8 shows selectivity variation of the composite membranes of the invention using thermally treated membranes vs non strengthened membranes.

FIGS. 7 and 8 show the effect of thermal treatment on one of the flat membranes of the invention. The permeance and selectivity are only slightly better than for the non strengthened analogues suggesting this step is barely necessary but for pressures above 10 bars, the non strengthened membranes lack sufficient mechanical strength, Example 11

Effect of Feed Pressure

Figure 4:
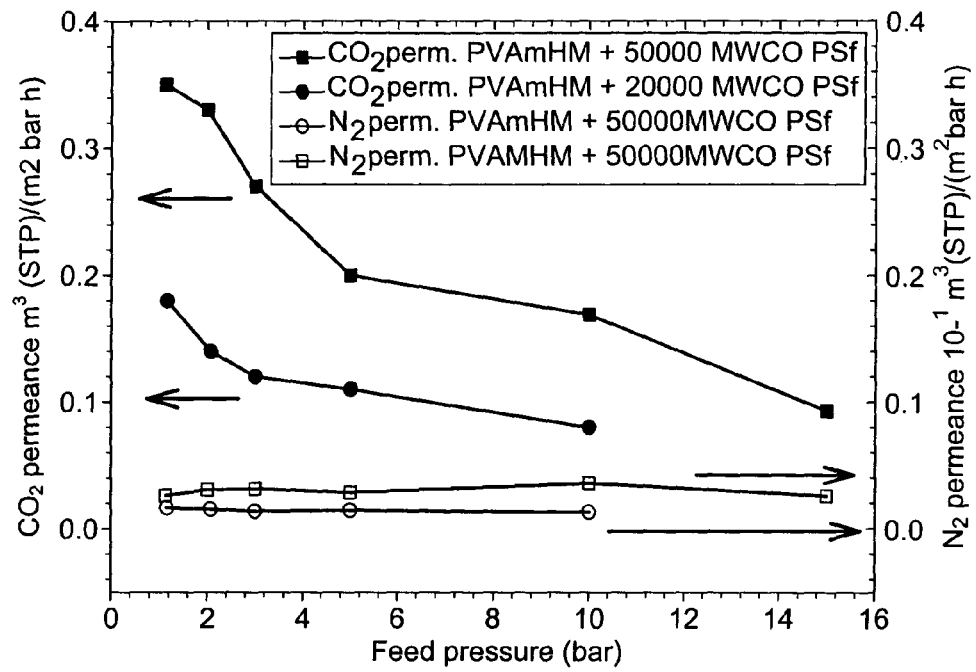
FIG. 4 shows permeance variation of the composite membranes of the invention with pressure.
Figure 5:
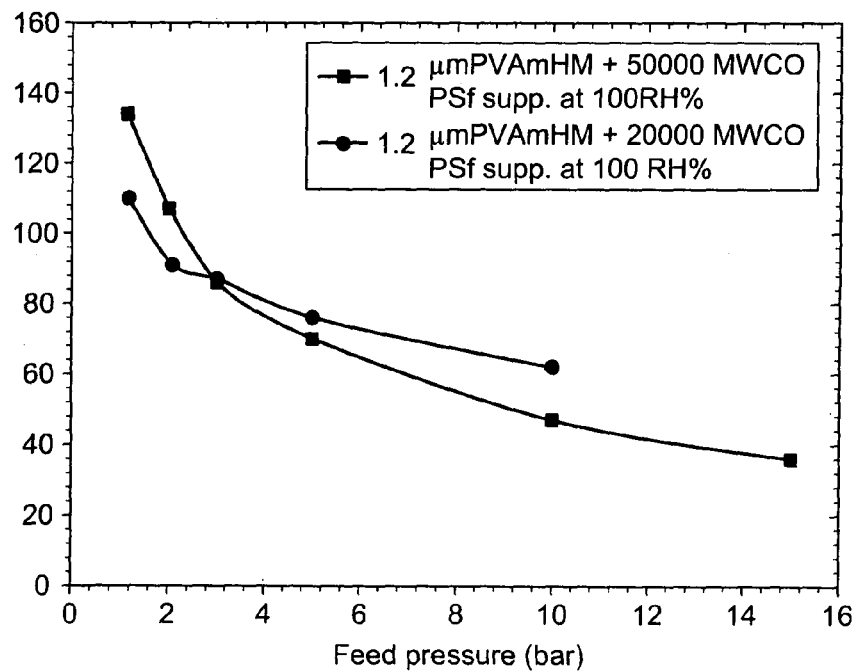
FIG. 5 shows selectivity variation of composite membranes of the invention with pressure.

FIGS. 4 and 5 shows the effect of the applied feed pressure on PVAmHM (340000 Mw) composite membrane $CO_2$ permeance and selectivity. The decrease in $CO_2$ permeance and $CO_2/N_2$ selectivity with the increase in feed pressure ($CO_2$ partial pressure) correlates with the $CO_2$ facilitated transport mechanism and it is explained by the saturation of fixed site carrier amino groups. It can be observed that the PVAmHM cast on more porous PSf support presents higher permeance up until 10 bars due to the larger pore size of the support. The difference in permeance is attributed to the effect of the porous support acting as a resistance in series with the selective PVAm layer. The $CO_2$ permeance of both membranes becomes similar at pressure higher than 10 bar due to a possible compression of the more porous support. The higher $CO_2/N_2$ selectivity up until 3 bar is explained by the higher $CO_2$ permeance of the 50000 MWCO support.

Example 12

Each flat membrane was continuously operated between 30 and 60 days showing stable performances by swinging feed relative humidity (RH %) between 0% to 100%, the pressure between 1 bar and 15 bar. A maximum permeance of 0.6 m$^3$ (STP)/(m$^2$ bar h) and selectivity of 200 at 1.1 bar feed pressure were obtained for PVAmHM 1.2 µm thickness membranes casted on 50 000 MWCO PSf without crosslinking.

Example 13

Effect of Solvent

Different solvents provide different volatilities and the quality of very thin films can be affected by drying conditions, especially for hollow fiber coating or large flat membranes. Maximum permeance and selectivity using different solvents, for a flat composite membrane of 1.2 µm thickness without crosslinking cast on PSf 50000 MWCO as support is presented in Table 1. The operating conditions were 10% $CO_2$-90% $N_2$ gas mixture at 2 bar as a feed. Using different solvents not only as a mean of casting a polymer in a shape of a film but mainly as an agent modifying the structure of the PVAm film provides different separation properties. The PVAm film structure and separation properties changes function of the PVAm solubility in different solvents, evaporating rate of the solvents, pH of the solvent (changing the character of PVAm from acid to base and implying the reactivity change of —NH2 groups) and interaction with the porous support (hydrophobic-hydrophilic character).

TABLE 1

Effect of casting solvent

| Type of solvent | Water | 10% water-90% formamide |
|---|---|---|
| Permeance $m^3(STP)/m^2$ bar hr | 0.6 | 2.1 |
| $CO_2/N_2$ selectivity | 204 | 388 |

Example 14

Gas Permeation Results for Hollow Fibre Type of Membrane

Table 2 presents the results of gas permeations using hollow fibre (HF) type membrane with a selective separating layer of PVAm of approx. 1 μm. If $CO_2/N_2$ selectivity does not differ to a great extent it may be attributed to the PVAm selective layer, while $CO_2$ permeance is affected to a great extent by the porous support. A porous support with a nanometer dense top layer such as polyphenylene oxide represents a more convenient choice in terms of gas separation and mechanical strength due to the intrinsic material properties.

TABLE 2

Effect of different HF support

| Type of HF membrane | PSf outside coated | PSf inside coated | PPO outside coated |
|---|---|---|---|
| OD/ID mm | 0.6/0.3 | 1/0.6 | 0.5/0.3 |
| Permeance $m^3 (STP)/m^2$ bar hr | 0.1 | 0.016 | 1.46 |
| $CO_2/N_2$ selectivity | 140 | 157 | 191 |

OD outer diameter,
ID inner diameter

What is claimed is:

1. A process for the formation of a composite membrane suitable for separating a gas from a gas mixture comprising:
   (I) obtaining a polyvinylamine (PVAm);
   (II) hydrolyzing said PVAm under conditions of acid to form a pre-treated PVAm;
   (III) forming a solution of said pre-treated PVAm in a solvent;
   (IV) casting said solution onto a support to form the composite membrane comprising the support and the solution of pre-treated PVAm in solvent; and optionally
   (V) thermal treating said composite membrane,
   wherein the PVAm in the composite membrane is not crosslinked.

2. A process as claimed in claim 1 wherein said support is porous.

3. A process as claimed in claim 1 wherein said solvent comprises methanol, ethylene glycol, formamide or mixtures of one or more of said solvents with water.

4. A process as claimed in claim 1 wherein the pH of the solution is at least 6.

5. A process as claimed in claim 1 wherein said PVAm in the composite membrane has a molecular weight of at least Mw 50,000 and wherein the composite membrane is heated to a temperature in the range 50 to 150° C. in step (V).

6. A process as claimed in claim 1 wherein said PVAm in the composite membrane has a molecular weight of at least Mw 50,000 and wherein the membrane is heated to a temperature in the range 80 to 120° C. in step (V).

7. A process as claimed in claim 1 wherein said PVAm in the composite membrane has a molecular weight of at least Mw 50,000 and is non-crosslinked.

8. A process as claimed in claim 1 wherein said PVAm in the composite membrane has a molecular weight of at least Mw 50,000 and wherein the support has a molecular weight of at least 20,000.

9. A process as claimed in claim 1 wherein said PVAm in the composite membrane has a molecular weight of at least Mw 50,000 and said support is microporous.

10. A process as claimed in claim 1 wherein the PVAm in the composite membrane has a Mw of at least 100,000.

11. A process as claimed in claim 1, wherein said support is polytetrafluoroethylene (PTFE), polypropylene (PP), sulphonated polysulfone (PSf), polyvinylidene fluoride (PVDF), polyimide (PI), polyether imide (PEI), aliphatic polyamide, polyetheretherketone (PEEK), or polyphenylene oxide (PPO).

12. A process as claimed in claim 1, wherein a carbon dioxide permeable layer separates the PVAm in the composite membrane from the support.

13. A process as claimed in claim 12, wherein said carbon dioxide permeable layer is polydimethylsiloxane (PDMS), PVA (polyvinylalcohol) or chitosan.

14. A process as claimed in claim 1 wherein the pretreated PVAm comprises less than 5 wt % polyvinylamide.

* * * * *